United States Patent
Chacko

(10) Patent No.: US 8,902,567 B2
(45) Date of Patent: Dec. 2, 2014

(54) CONDUCTIVE POLYMER DISPERSIONS FOR SOLID ELECTROLYTIC CAPACITORS

(75) Inventor: Antony Chacko, Greer, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 329 days.

(21) Appl. No.: 13/480,156

(22) Filed: May 24, 2012

(65) Prior Publication Data

US 2012/0300370 A1    Nov. 29, 2012

Related U.S. Application Data

(60) Provisional application No. 61/489,571, filed on May 24, 2011.

(51) Int. Cl.
| | | |
|---|---|---|
| H01G 9/02 | (2006.01) | |
| H01G 9/028 | (2006.01) | |
| H01G 9/00 | (2006.01) | |
| H01G 9/15 | (2006.01) | |

(52) U.S. Cl.
CPC ............ *H01G 9/028* (2013.01); *H01G 9/0036* (2013.01); *H01G 9/15* (2013.01)
USPC .......................................... 361/525; 361/523

(58) Field of Classification Search
USPC ................................. 361/525, 523
See application file for complete search history.

(56) References Cited

U.S. PATENT DOCUMENTS

| | | | |
|---|---|---|---|
| 5,300,575 A | 4/1994 | Jones et al. | |
| 5,951,840 A | 9/1999 | Fukaumi et al. | |
| 6,229,688 B1 | 5/2001 | Kobayashi et al. | |
| 7,563,290 B2 | 7/2009 | Qiu et al. | |
| 7,773,366 B2 | 8/2010 | Nemoto et al. | |
| 8,339,770 B2 * | 12/2012 | Yoshida et al. | ............... 361/525 |
| 2006/0221649 A1 | 10/2006 | Yamanaka et al. | |
| 2006/0223976 A1 | 10/2006 | Tozawa et al. | |
| 2006/0240593 A1 | 10/2006 | Igaki et al. | |
| 2008/0023036 A1 | 1/2008 | Ha et al. | |
| 2010/0091432 A1 | 4/2010 | Sugawara et al. | |
| 2010/0254072 A1 | 10/2010 | Nobuta et al. | |
| 2011/0019340 A1 | 1/2011 | Nobuta et al. | |

FOREIGN PATENT DOCUMENTS

| | | | |
|---|---|---|---|
| JP | 2001148331 A | * | 5/2001 |
| KR | 10-2008-0036985 | | 4/2008 |

OTHER PUBLICATIONS

International Preliminary Report on Patenbability; prepared by KIPO as ISA; PCT/US2012/039435; Kemet Electronics Corporation; Dec. 5, 2013.

* cited by examiner

*Primary Examiner* — Eric Thomas
(74) *Attorney, Agent, or Firm* — Joseph T. Guy; Perkins Law Firm, LLC

(57) ABSTRACT

A capacitor with an anode and a dielectric over the anode. A first conductive polymer layer is over the dielectric wherein the first conductive polymer layer comprises a polyanion and a first binder. A second conductive polymer layer is over the first conductive polymer layer wherein the second conductive polymer layer comprises a polyanion and a second binder and wherein the first binder is more hydrophilic than the second binder.

94 Claims, 2 Drawing Sheets

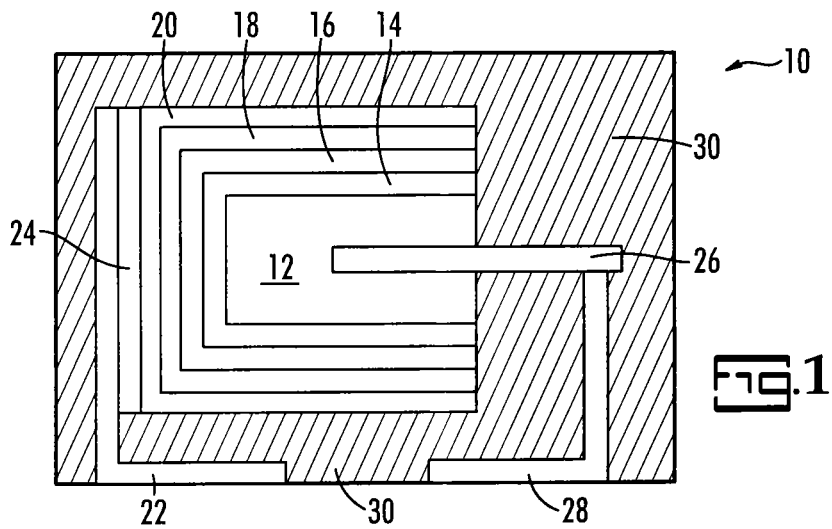
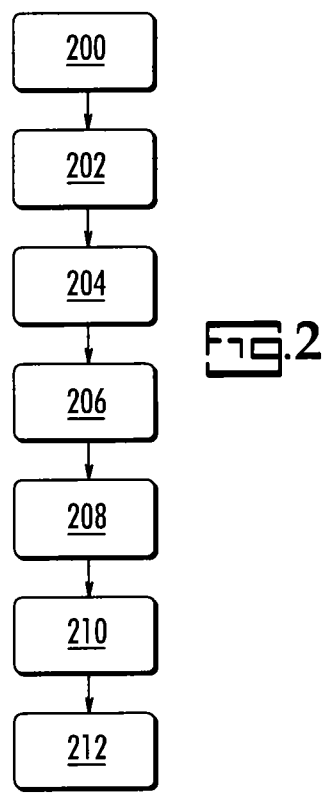

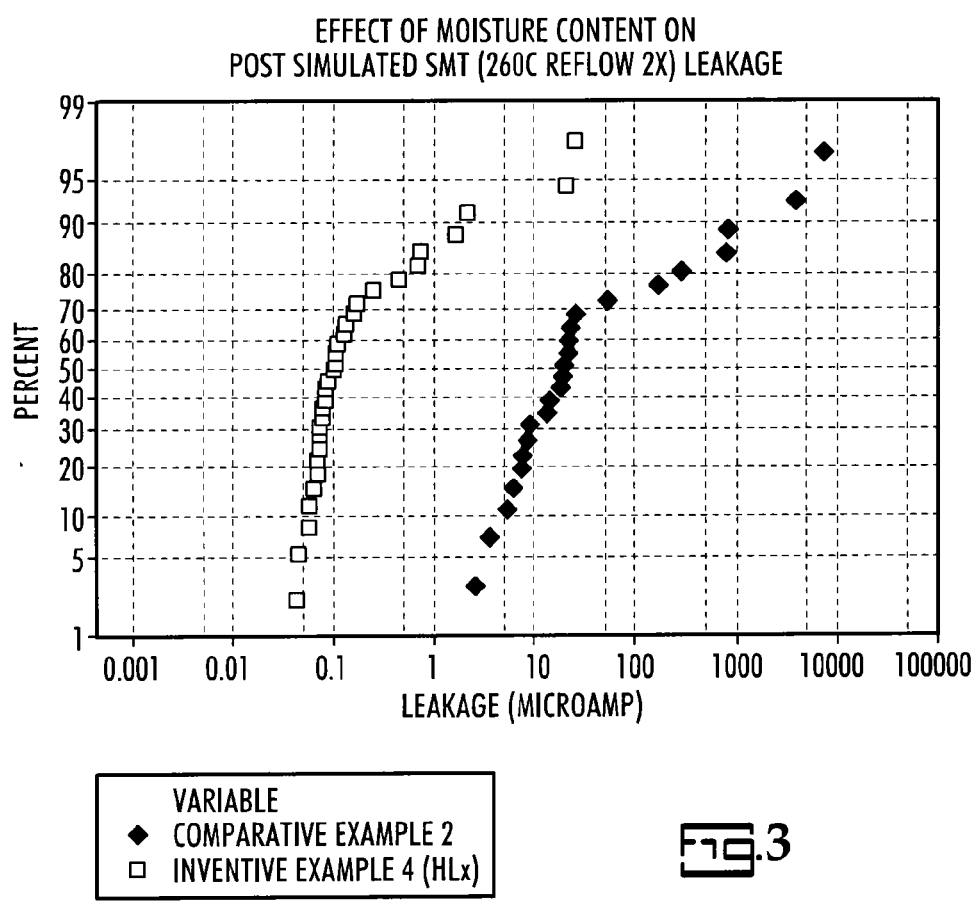

CONDUCTIVE POLYMER DISPERSIONS FOR SOLID ELECTROLYTIC CAPACITORS

CROSS-REFERENCE TO RELATED APPLICATIONS

This application claims priority to U.S. Provisional Application No. 61/489,571 filed May 24, 2011 which is incorporated herein by reference.

BACKGROUND

The present invention is related to an improved method of forming a solid electrolyte capacitor and an improved capacitor formed thereby. More specifically, the present invention is related to an improved cathode where the cathode comprises highly conductive polymer dispersion coatings with enhanced reliability. The invention also discloses methods for manufacturing the intrinsically conductive polymer dispersions. The present invention is related to an improved method of forming a solid electrolyte capacitor and an improved capacitor formed thereby. More specifically, the present invention is related to a capacitor with improved leakage stability.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials such as polyaniline, polypyrrole, polyethylenedioxythiophene and their derivatives. Solid electrolytic capacitors with intrinsically conductive polymers as the cathode material have been widely used in the electronics industry due to their advantageous low equivalent series resistance (ESR) and "non-burning/non-ignition" failure mode. In the case of conductive polymer cathodes the conductive polymer is typically applied by either chemical oxidation polymerization, electrochemical oxidation polymerization or spray techniques with other less desirable techniques being reported.

The backbone of a conductive polymer consists of a conjugated bonding structure. The polymer can exist in two general states, an undoped, non-conductive state, and a doped, conductive state. In the doped state, the polymer is conductive but of poor processability due to a high degree of conjugation along the polymer chain, while in its undoped form, the same polymer loses its conductivity but can be processed more easily because it is more soluble. When doped, the polymer incorporates anionic moieties as constituents on its positively charged backbone. In order to achieve high conductivity, the conductive polymers used in the capacitor must be in doped form after the completion of the process, although during the process, the polymer can be undoped/doped to achieve certain process advantages.

Various types of conductive polymers including polypyrrole, polyaniline, and polyethyldioxythiophene are applied to the Ta capacitors. The major drawback of conductive polymer capacitors, regardless of the types of conductive polymers employed, is their relatively low working voltage compared to their $MnO_2$ counterparts. The polymer capacitors have reliability issues, to varying degrees, when the voltage rating exceeds 25V. This is believed to be caused by the relatively poor dielectric-polymer interface, which has poor "self-healing" capability. The ability to withstand high voltage can be best characterized by the breakdown voltage (BDV) of the capacitors. Higher BDV corresponds with better reliability. For reasons which were previously unknown the break down voltage of capacitors comprising conductive polymers has been limited to about 55V thereby leading to a capacitor which can only be rated for use at about 25V. This limitation has thwarted efforts to use conductive polymers more extensively.

U.S. Pat. No. 7,563,290, which is incorporated herein by reference, describes the slurry/dispersion process. The resulted capacitors show excellent high voltage performances, reduced DC leakage (DCL) and improved long term reliability.

It is highly desirable that the capacitor devices are of high reliability and that they can withstand stressful environments. Therefore, the integrity of the anodes and the robustness of conductive polymer cathode are essential for high quality capacitor products. However, it is a challenge to form a conductive polymer coating on the anodes that is defect-free, and which is capable of withstanding thermal mechanical stress during anode resin encapsulation and surface-mounting. The improper application of polymer slurry often leads to the formation of cracks and delaminating of the polymer coating thus formed.

In a manufacturing process to produce conductive polymer based valve metal capacitors the valve metal powder, such as tantalum, is mechanically pressed into anodes that are subsequently sintered to form porous bodies. The anodes are anodized to a pre-determined voltage in a liquid electrolyte to form a dielectric layer onto which a cathode layer of conductive polymer is subsequently formed via an in situ polymerization process comprising multi-cycle oxidizer/monomer coatings and polymerization reactions. The anodes are then coated with graphite and Ag followed by assembling and molding into a finished device.

Today, almost all electronic components are mounted to the surface of circuit boards by means of infra-red (IR) or convection heating of both the board and the components to temperatures sufficient to reflow the solder paste applied between copper pads on the circuit board and the solderable terminations of the surface mount technology (SMT) components. A consequence of surface-mount technology is that each SMT component on the circuit board is exposed to soldering temperatures that commonly dwell above 180° C. for close to a minute, typically exceeding 230° C., and often peaking above 250° C. If the materials used in the construction of capacitors are vulnerable to such high temperatures, it is not unusual to see significant shifts in ESR and leakage which lead to negative shifts in circuit performance.

The state of the art for inherently conductive polymer (ICP) dispersions has a number of issues when solid electrolytic capacitors with conductive polymer dispersions are exposed to SMT conditions.

The presence of moisture in the materials used in capacitors can cause poor package integrity due to SMT reflow conditions. Conductive polymer dispersions have relatively high moisture sorption in comparison with insitu polymerized conductive polymer. Presence of hydrophilic polyanions, specifically polystyrene sulfonic acid, is one of the reason for the high moisture sorption. Insitu polymerized parts use monomeric dopant in comparison to polymeric dopants, polyanions, used in dispersions. When heated to a temperature higher than the boiling point of water, which occurs during mounting of the capacitor on the mounting substrate by solder reflow, moisture contained in the capacitor element of the capacitor is vaporized which increases the internal pressure of the mold resin. Since the capacitor is rapidly heated to the solder reflow temperature, which is substantially higher than the boiling point of water, the internal pressure of the capacitor is increased substantially and rapidly. In such cases, since the capacitor element is completely encapsulated by the humidity resistant mold resin of such as epoxy resin, vapor thus generated in the capacitor cannot escape through the mold resin, so that all high pressure due to water vapor is exerted on the mold resin. As a result, portions of the mold resin are cracked and water vapor in the mold resin release through the cracks. This is particularly a problem in thin portions of the resin such as near connection portions and on the lower surface side.

U.S. Pat. No. 6,229,688 discloses a method to reduce case integrity/case cracking by providing a water release mechanism. The solid electrolytic capacitor features a water vapor passage formed in the mold resin. The water vapor discharge passage is formed of a material having higher water vapor permeability than that of the mold resin and functions to communicate an interior of the mold resin to atmosphere.

A number of approaches are reported to improve moisture resistance of the materials in the capacitor. One approach to improving moisture resistance is provided in U.S. Publ. Pat. Appl. No. 20100254072 wherein conductive polymer dispersions and solid electrolytic capacitors are taught to have a low ESR and an excellent moisture resistance due to incorporation of a sulfonic acid ester compound in the conducting polymer.

Another approach is provided in U.S. Publ. Pat. Appl. No. 2011/0019340 where the electrically conductive polymer suspension comprises dopant composed of a polyacid or a salt thereof; at least one compound selected from erythritol, xylitol and pentaerythritol; and a dispersion medium. U.S. Publ. Pat. Appl. No. 20060223976 provides a conductive polymer excellent in conductivity, heat resistance and moisture resistance, by including at least one organic sulfonate having an anion of an organic sulfonic acid, that is the same or different from the organic sulfonic acid incorporated in the conductive polymer as a dopant, and a cation other than transition metals.

Another approach is disclosed in U.S. Publ. Pat. Appl. No. 2010/0091432 wherein the conductive polymer includes a conductive polymer, a polyanion that includes a hydrophilic group, where the polyanion functions as a dopant of the conductive polymer. Further, at least a part of the hydrophilic group of the polyanion is condensed with an epoxy group in a compound with one epoxy group.

Another problem with conductive polymer containing solid electrolytic capacitor is the high leakage at high temperatures and after surface mount conditions. It is theorized that one of the causes of this high leakage under these conditions is the lack of sufficient moisture in the ICP coating. A lack of moisture in the ICP material during processes, such as surface mount, can cause leakage in solid electrolytic capacitors.

U.S. Pat. No. 7,773,366 discloses a method for incorporating a water retaining layer to improve leakage and other electrical characteristics of a solid electrolytic capacitor. In this method, a water-retaining layer having higher water absorption than that of the housing is placed between the conductive polymer layer and the housing. The water absorption of the housing is preferably 0.04% or less. Thereby, water dissipated to the outside through the housing can be suppressed, and the reduction in the content of internal water can be prevented. As the water-retaining layer, an epoxy resin can be used, and the water-retaining layer can be formed by applying a liquid epoxy resin.

U.S. Publ. Pat. Appl. No. 2006/0240593 discloses a method for improving leakage current by incorporating organic compounds having a boiling point of not lower than 150° C. and a melting point of no higher than 150° C. While some of the above mentioned references claim moisture resistance improvement, other reference claim improved performance with a water retaining layer. However these approaches do not address the need for a balance between moisture resistance/low moisture sorption and moisture retention for solid electrolytic capacitor with improved reliability. The above approaches also do not address issues related with SMT reflow exposures.

Thus, there is a need for a process for forming solid electrolytic capacitors with improved leakage and leakage stability. A particular need is for capacitor parts to have stable leakage during surface mount temperatures.

Thus, a need exists for the proper management of moisture which is required to produce solid electrolytic capacitors with excellent reliability. Here to fore it has not been recognized that a delicate balance of moisture content and moisture retention properties are required to simultaneously avoid poor package integrity and high leakage current after being subjected to SMT conditions.

SUMMARY

It is an object of the invention to provide an improved solid electrolytic capacitor.

It is another object of the invention to provide an improved method of preparing a solid electrolytic capacitor cathode with good reliability.

It is another object of the invention to provide an improved method of preparing a solid electrolytic capacitor cathode with good leakage current when exposed to high temperature conditions.

It is another object of the invention to provide an improved method of preparing solid electrolytic capacitor cathodes with good package integrity when exposed to SMT conditions.

These and other advantages, as will be realized, are provided a capacitor. The capacitor has an anode and a dielectric over the anode. A conductive polymer layer is over the dielectric wherein the conductive polymer layer has a moisture content of at least 16 wt % and a moisture loss of no more than 5 wt % upon heating from 125° C. to 175° C.

Yet another embodiment is provided in a capacitor with an anode and a dielectric over the anode. A first conductive polymer layer is over the dielectric wherein the first conductive polymer layer comprises a polyanion and a first binder. A second conductive polymer layer is over the first conductive polymer layer wherein the second conductive polymer layer comprises a polyanion and a second binder and wherein the first binder is more hydrophilic than the second binder.

Yet another embodiment is provided in a capacitor with an anode and a dielectric over the anode. A first conductive polymer layer is over the dielectric wherein the first conductive polymer layer has a first moisture content. A second conductive polymer layer is over the first conductive polymer layer wherein the second conductive polymer layer has a second moisture content. The first moisture content is at least 5 wt % higher than the second moisture content.

Yet another embodiment is provided in a capacitor with an anode and a dielectric over the anode. A first polymer layer is over the dielectric and a second polymer is over the first polymer layer. The first polymer layer and said second polymer layer have a moisture loss of less than 5 wt % upon heating from 125° C. to 175° C.

Yet another embodiment is provided in a method for forming a capacitor comprising:
providing an anode with a dielectric coating thereon;
applying a first dispersion over the dielectric thereby forming a first conductive polymer layer over the dielectric coating wherein the first conductive polymer layer comprises a hydrophilic material; and
applying a second dispersion over the first conductive polymer layer thereby forming a second conductive polymer layer over the first conductive polymer layer.

Yet another embodiment is provided in a capacitor with an anode and a dielectric over the anode. A first conductive polymer layer is over the dielectric wherein the first conductive polymer layer has a moisture content of at least 20 wt %. A second conductive polymer layer is over the first conductive polymer layer wherein the second conductive polymer layer comprises at least one material selected from a hydrophobic material and a moisture retaining compound.

BRIEF DESCRIPTION OF FIGURES

FIG. 1 is a schematic cross-sectional view of an embodiment of the invention.
FIG. 2 is a flow-chart schematic representation of an embodiment of the invention.
FIG. 3 graphically illustrates the effect of moisture on leakage current after simulated SMT.

DESCRIPTION

The present invention is related to an improved capacitor and a method for making the improved capacitor. More particularly, provided herein is a method that allows the production of capacitors with improved reliability.

The invention will be described with reference to the figures which form an integral non-limiting part of the specification.

An embodiment of the invention will be described with reference to FIG. 1. In FIG. 1, a capacitor, generally represented at 10, is illustrated schematically in cross-sectional view. The capacitor comprises an anode, 12, which will be more fully described herein. A dielectric, 14, is formed on the anode which is preferable an oxide of the anode. A first conductive polymer layer, 16, is formed on the dielectric. The first conductive polymer layer may represent a single layer, such as applied by a single application, or multiple layers of similar composition. A second conductive polymer layer, 18, is formed on the first conductive polymer layer. The second conductive polymer layer may represent a single layer, such as applied by a single application, or multiple layers of similar composition. The first conductive polymer layer and second conductive polymer layer will be described with more detail herein. An adhesive layer, 20, provides a surface to which an external cathode termination, 22, may be attached such as by solder, 24. The adhesive layer typically comprises multiple sub-layers including at least one carbon layer, which readily adheres to the second conductive polymer layer, followed by at least one metal containing layer which readily adheres to the carbon layer and which can be soldered. An anode lead wire, 26, extends from the anode and is in electrical contact with an external anode termination, 28. The entire capacitor, except for the lower portion of the external cathode termination and external anode termination, is preferable encased in a non-conductive resin, 30.

An embodiment of the invention will be illustrated with reference to FIG. 2. In FIG. 2 a flow chart representation of the process for forming a capacitor is provided. An anode is formed at 200. The anode can be formed by pressing a powder into a monolith or by forming a sheet of conductive material. If a monolith is used it is preferable to attach an anode lead wire to the anode. A dielectric is formed on the anode at 202. The dielectric is preferably an oxide of the anode for manufacturing convenience but is not limited thereto. At least one layer of a first conductive polymer layer is formed at 204. The polymer layer can be applied by in-situ polymerization or by dipping in a dispersion or slurry of conductive polymer. Dipping in a slurry of conductive polymer is most preferred herein due to the intended incorporation of hydrophilic enhancing materials. At least one layer of a second conductive polymer layer is formed at 206. The second conductive polymer layer can be applied by in-situ polymerization or by dipping in a dispersion or slurry of conductive polymer. Dipping in a slurry of conductive polymer is most preferred herein due to the intended incorporation of hydrophilic enhancing materials. Adhesive layers are applied at 208. The adhesive layers provide a surface upon which an external lead can be attached. Though not limited thereto at least one carbon layer followed by at least one metal containing layer is typically sufficient to demonstrate the instant invention. External terminations are applied at 210 if desired. External terminations are in electrical contact with the cathode in one instance and the anode in another and form the electrical contact between the conductors of the capacitor and the circuit trace in an electronic device. The capacitor is finished at 212 which may include resin encapsulating, testing, packing and the like.

In direct contradiction to the expectations in the art, the present invention is specific to methods to retain the moisture content of the conductive polymer layer through the SMT process. The conundrum facing those of skill in the art has always been the choice of having a relatively high moisture content, which was advantageous for leakage current but which caused severe problems in an SMT process, or having a low moisture, which was advantageous for use in an SMT process but the capacitors suffer from a high leakage current. The present invention solves the problem of the art by formulating conductive polymer layers which have a desired level of moisture and which is able to retain that moisture within the layer during SMT applications.

The first conductive polymer layer and second polymer layer work in concert to retain moisture within a predefined level.

In one embodiment, the first conductive polymer layer has a moisture content which is higher than the moisture content of the second conductive polymer and the second conductive polymer layer inhibits moisture from escaping there through. This is accomplished by differential hardening, differential surface tension of the layers, of differential hydrophilicity/hydrophobicity of the layers. The first conductive polymer layer preferable has a moisture content which is at least 110% by weight of the moisture content of the second conductive polymer layer. More preferably, the first conductive polymer layer has a moisture content which is at least 200% by weight of the moisture content of the second conductive polymer layer.

In one embodiment the first conductive polymer layer and second conductive polymer layer have a moisture content of at least 10 to 30 wt % and a moisture loss of no more than 5% upon heating from 125° C. to 175° C.

In one embodiment the first conductive polymer layer loses no more than 5 wt % moisture upon heating from 125° C. to 175° C. It is particularly preferred that the first conductive polymer layer has a moisture retention defined by a moisture loss of no more than 3% upon heating from 125° C. to 175° C.

more preferably no more than 2 wt % and even more preferably no more than 1 wt %. By controlling the relative moisture retention of the layers the moisture which is in the first conductive polymer layer, closest to the dielectric, cannot release the moisture due to the second conductive polymer layer effectively forming a barrier layer.

To accomplish the differential moisture content, and moisture retention and of the first conductive layer and second conductive layer it is highly preferable that the first conductive polymer layer be relatively hydrophilic and the second conductive polymer layer be relatively hydrophobic. The desire of the first conductive polymer layer to contain and retain moisture is therefore enhanced by the desire of the second conductive polymer layer to exclude moisture. With a carefully balanced combination of layers the moisture content can be achieved which allows for low leakage current while insuring that the moisture is retained through SMT operation. Moisture retention is enhanced by incorporating materials which absorb and retain water into the conductive polymer layer. Particularly suitable materials include hydrogels, molecular sieves, and molecular containers.

The term molecular sieve and molecular containers refers to a particular property of these materials which is the ability to selectively sort molecules based primarily on a size exclusion process. A molecular sieve is a material containing tiny pores of a precise and uniform size that is used as an adsorbent for gases and liquids. Molecules small enough to pass through the pores are adsorbed while larger molecules are not. It is different from a common filter in that it operates on a molecular level and traps the adsorbed substance. For instance, a water molecule may be small enough to pass through the pores while larger molecules are not, so water is forced into the pores which act as a trap for the penetrating water molecules which are retained within the pores. Because of this, they often function as a desiccant. A molecular sieve can adsorb water up to 22% of its own weight.

The principle of adsorption to molecular sieve particles is somewhat similar to that of size exclusion chromatography, except that without a changing solution composition, the adsorbed product remains trapped because in the absence of other molecules able to penetrate the pore and fill the space, a vacuum would be created by desorption. This is due to a very regular pore structure of molecular dimensions. An example of molecular sieve is zeolite. Zeolites are the aluminosilicate members of the family of microporous solids known as "molecular sieves." The maximum size of the molecular or ionic species that can enter the pores of a zeolite is controlled by the dimensions of the channels. These are conventionally defined by the ring size of the aperture, where, for example, the term "8-ring" refers to a closed loop that is built from 8 tetrahedrally coordinated silicon (or aluminum) atoms and 8 oxygen atoms. These rings are not always perfectly symmetrical due to a variety of effects, including strain induced by the bonding between units that are needed to produce the overall structure, or coordination of some of the oxygen atoms of the rings to cations within the structure. Therefore, the pores in many zeolites are not cylindrical.

In addition to molecular sieves, a further enhancement of moisture retaining property can be obtained by incorporating certain inorganic particles such as natural or synthetic clay and their derivates, cyclodextrins and their derivatives. Any inorganic or organic particles with certain pore size, preferably 1-30 Angstroms, and polarity which assists in retaining moisture can be used for this application. Any organic or inorganic particles with certain pore size and hydrogen bonding can be used for retaining moisture.

Hydrogels are a class of polymer materials than can absorb large amounts of water without dissolving. Solubility is prevented by physical or chemical crosslinks in the hydrophilic polymer. Hydrogels are defined as two- or multicomponent systems consisting of a three-dimensional network of polymer chains and water that fills the space between macromolecules. Depending on the properties of the polymers used, as well as on the nature and density of the network joints, such structures in an equilibrium can contain various amounts of water; typically in the swollen state the mass fraction of water in a hydrogel is much higher than the mass fraction of polymer. Two general classes of hydrogels can be defined. Physical gels, or pseudogels, have chains which are connected by electrostatic forces, hydrogen bonds, hydrophobic interactions or chain entanglements. Physical gels are non-permanent and usually they can be converted to polymer solutions by heating. Chemical hydrogels have covalent bonds linking the chains.

A hydrogel is a network of polymer chains that are hydrophilic, sometimes found as a colloidal gel, in which water is the dispersion medium. Hydrogels are highly absorbent natural or synthetic polymers which can contain over 99% by weight water. Hydrogel material comprises hydrophilic crosslinked network polymers which can form a hydrogen bond with moisture. Hydrogel materials further comprise particles of hydrogel materials.

Examples of crosslinked hydrogel materials suitable for demonstration of the invention are materials comprising crosslinked polymers and particles formed from vinyl pyrrolidone polymers and copolymers, chitosan polymers and blends, vinyl alcohol polymers and copolymers, vinyl acetate polymers and copolymers, hydroxyl functional cellulosic polymers, acrylic acid polymers and their copolymers, acrylamide polymers and their copolymers, functionalized nanoparticles of various hydrophilic polymers which can form crosslink with other hydrophilic binders. Conductive polymer based hydrogel can be formed by a minimal number of modification in the binder system of the conductive polymer dispersion. Methods include forming a crosslinked networked formed from a self crosslinked hydrophilic binder, crosslinks formed from ICP dispersion components and a very hydrophilic binder, hybrid crosslinks formed from two or more hydrophilic binders, semi-interpenetrating networks formed from two or more polymer networks interpenetrating each other, ionically crosslinked hydrogels formed from crosslinking between one or more hydrophilic binders which can ionically crosslink with each other or with ICP dispersion components.

Hydrogels must be able to hold, in equilibrium, certain amounts of water. This implies that the polymers used in these materials must have at least moderate hydrophilic character. In practice, to achieve high degrees of swelling, it is common to use synthetic polymers that are water-soluble when in non-crosslinked form. Typical simple materials applied for general-purpose hydrogels are poly(ethylene oxide), poly(vinyl alcohol), polyvinylpyrrolidone and poly(hydroxyethyl methacrylate). Examples of hydrogel materials are polyurethane, poly(ethyleneglycol), poly(propylene glycol), poly(vinylpyrrolidone), hydroxylethyl cellulose, Xanthan, methyl cellulose, starch, poly(vinylpyrrolidone), poly(acrylic acid), carboxymethyl cellulose, hydroxypropyl methyl cellulose, polyvinyl alcohol, acrylic acid, methacrylic acid, chitosan, $\alpha\beta$-glycerophosphate, Hydrophilic polyesters, polyphosphazenes, polypeptides, chitosan, poly(vinyl methyl ether) and poly(N-isopropyl acrylamide). A particularly suitable combination for demonstrating the invention is polyethylene oxide, polyvinyl alcohol and hydroxylethyl cellulose.

A mixture of hydrogel materials and zeolite particles can be combined to obtain a synergistic moisture retaining property.

For retaining moisture at higher temperatures, such as above 200° C., the zeolite or hydrogel can be encapsulated in a high temperature polymer or binder. The encapsulating polymer or binder is chosen such that it prevents moisture from releasing below certain high temperatures and facilitates gradual release of moisture above this high temperature. This temperature is determined by the glass transition or softening temperature of the binder. The glass transition temperature of the encapsulating binder is preferably above 100° C., more preferably above 150° C. and most preferably above 200° C. Above the glass transition or softening temperature, moisture permeability through the binder film gradually increases. This controlled release prevents rapid release of moisture, but ensures that sufficient moisture is retained to provide the desired property of the device. High performance high Tg polymers such as polyimide and copolymers, polyetherether ketone (PEEK) and copolymers, polyphenyl sulfone and copolymers, polysulfone and copolyemrs, polypthalamine (PPA) and copolymers, polyamideimide (PAI) and copolymers, liquid crystal polymer (LCP), novolak based epoxy resins, cresol novolak epoxy resins etc. can be used. In addition high barrier polymer such as polyvinylidine chloride can also be used as encapsulant.

The first conductive polymer layer is rendered relatively hydrophilic by incorporation of hydrophilic materials into the polymer layer. The hydrophilic material is preferably added at a level of 5 wt % to no more than 70 wt %. Below about 5 wt % the moisture retention properties are insufficient to realize the advantages. Above about 70 wt % the layer conductivity decreases which is detrimental. The first conductive polymer layer preferably has a hydrophilicity enhancing material selected from hydrophilic polymers and hydrogels. The polymers may be cross-linked and a cross-linked polymer is preferred in some instances. Particularly preferred hydrophilicity enhancing materials include poly(ethylene oxide), poly(vinyl alcohol), poly(hydroxyethyl methacrylate), polyethyleneoxide-polyvinyl alcohol-cellulose, polyurethane, poly(ethyleneglycol), poly(propylene glycol), poly(vinylpyrrolidone), Xanthan, methyl cellulose, starch, poly(vinylpyrrolidone), poly(acrylic acid), carboxymethyl cellulose, hydroxypropyl methyl cellulose, polyvinyl alcohol, acrylic acid, methacrylic acid, chitosan, $\alpha\beta$-glycerophosphate, polyphosphazenes, polypeptides, poly(vinyl methyl ether) or poly(N-isopropyl acrylamide). One of the desirable requirements for these materials is good film forming properties and the ability to form flexible films which are crack resistant on mechanical or thermal stress. Some polyanions used for conductive polymers are hydrophilic but they tend to be brittle on exposure to stress and cannot be used reliably to enhance hydrophilicity.

The second conductive polymer layer is rendered relatively hydrophobic by incorporation of hydrophobic materials into the polymer layer. The hydrophobic material is preferably added at a level of 5 wt % to no more than 70 wt %. Below about 5 wt % the ability to function as a blocking layer to moisture migration from the first conductive polymer layer is insufficient to realize the advantages. Above about 70 wt % the layer conductivity decreases which is detrimental. The second conductive polymer layer preferably has a hydrophobicity enhancing material selected from thermosetting materials, fluoro-polymers and their copolymers, silicone polymers and their copolymers, silicone epoxy, silicone polyester silicone modified polyimides, fluorinated polyimides, crosslinkable acrylics, crosslinkable polyester, crosslinkable polyvinyl butyral, crosslinkable epoxies, hyperbranched hydrophobic polymers, hydrophobic silanes, or hydrophobically modified organic and inorganic particles.

The second conductive polymer layer preferably has hydrophobic properties and low permeability to moisture and can be used to prevent moisture from releasing from the first moisture retaining layer. Moisture permeability of the second conductive polymer layer can be decreased by forming dense crosslinked networks formed from crosslinking between binders, polyanions, and rheological additives. Interpenetrating networks of these materials where two or more polymeric chains interpenetrate each other can also decrease moisture permeability. Incorporation of nanoparticles in the conductive polymer dispersion also can decrease the permeability of moisture through these films.

Hydrophobicity of the conductive polymer dispersion can be modified by incorporating silicone and various materials to obtain a critical surface tension. Several methods are developed to improve hydrophobicity. One of the methods is the use of hydrophobic interpenetrating networks in the conductive polymer dispersions. Silicone polymers can be made water soluble by incorporating ethylene oxide functionality. When these silicone-ethylene oxide copolymers with hydroxyl groups react with a co-binder, the hydrophobic silicone group blooms outward towards the interface thus imparting hydrophobicity. Perfluoro- and octyl-functionalized silane also behave similarly when used as an additive. The silanol groups react with hydroxyl groups in the system and the hydrophobic perfluoro- or octyl-groups bloom outward toward the interface giving hydrophobicity. An interpenetrating network system where some of the available hydrophilic functional groups in the conductive polymer dispersion such as polyanion, rheological additives, and binder, are crosslinked with hydroxyl functional hydrophobic silicone-ethylene oxide copolymers. These multiple crosslinks through multiple polymeric chains create an interpenetrating network with low permeability to water. Additionally, the composition may also contain a mixture of perfluoro- and octyl-functionalized silane and multifuctional silane, or dipodal silane, where the critical surface tension of the silane is below 35 dynes/cm.

In one embodiment the conductive polymer dispersion comprises a conductive polymer and a mixture of polyanion where one of the polyanions contains at least one sulfonic acid and one carboxylic acid, a polymeric binder which contains hydroxy functional groups, where one of the binders is preferably a hydroxyl functional silicone-ethylene oxide copolymer, a rheology additive containing carboxylic and hydroxy functional groups, a mixture of silane and dipodal silane coupling agents where one of the silane has a critical surface tension below 35 dynes/cm, a crosslinking agent containing at least one carboxylic group where the crosslinking reaction results in an ester formation between polyanion and binder and rheology additive and the crosslinker, where the presence of multiple crosslinking networks through multiple polymeric chains creates hydrophobic interpenetrating networks.

Both silicone copolymer and hydrophobic silane incorporation into conductive polymer dispersion result in an conductive polymer dispersion coating with a critical surface tension suitable for the second conductive polymer layer.

The anode is a conductor and more preferably a valve metal or conductive oxide of a valve metal with tantalum, aluminum, niobium and niobium oxide being mentioned as particularly preferred. An advantage of the high surface area is that a very high capacitance density can be achieved.

Conjugated polymers are particularly suitable for use as the electrically conductive solid cathode with polyaniline, polypyrroles and polythiophenes being most preferred. A particularly preferred polymer for use as a cathode is polythiophene. The polymer precursors are polymerized to form the conductive layer which functions as the cathode of the capacitor. The polymer precursors are preferably polymerized by either electrochemical or chemical polymerization techniques with oxidative chemical polymerization being most preferred. In one embodiment, the conductive layer is formed by dipping the anodized substrate first in a solution of an oxidizing agent such as, but not necessarily limited to iron (III) p-toluenesulfonate. After a drying step, the anode bodies are then immersed in a solution comprising monomer and oligomer of the conductive polymer and solvents.

It is preferred to include a dopant in the polymer as known in the art. The dopant can be coated separately or included in the polymer slurry or monomer solution. A particularly preferred dopant is the sodium salt of polystyrenesulfonate (PSS).

The conducting polymer is preferably an intrinsically conducting polymer comprising repeating units of a monomer of Formula I and optionally an oligomer Formula II:

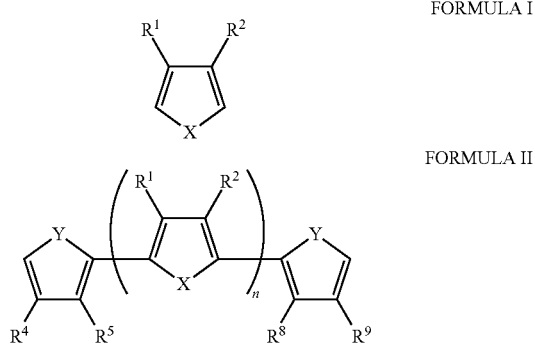

FORMULA I

FORMULA II $R^1$ and $R^2$ of Formula I and $R^4$-$R^9$ of Formula II are chosen to prohibit polymerization at the α-site of the ring. It is most preferred that only α-site polymerization be allowed to proceed. Therefore, it is preferred that $R^1$ and $R^2$ are not hydrogen. More preferably $R^1$, $R^2$, $R^4$, $R^5$, $R^6$, $R^7$, $R^8$ and $R^9$ are α-directors. Therefore, ether linkages are preferable over alkyl linkages. It is most preferred that the groups are small to avoid steric interferences. For these reasons $R^1$ and $R^2$, $R^4$ and $R^5$, $R^6$ and $R^7$ or $R^8$ and $R^9$ each taken together as —O—$(CH_2)_2$—O— is most preferred.

In Formula II n is an integer selected from 0-3.

In Formulas I and II, X and Y independently are S, Se or N. Most preferably X and Y are S.

$R^1$, $R^2$, $R^4$, $R^5$, $R^6$, $R^7$, $R^8$ and $R^9$ independently represent linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, $R^4$ and $R^5$, $R^6$ and $R^7$ or $R^8$ and $R^9$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl.

More preferably $R^1$, $R^2$, $R^4$, $R^5$, $R^6$, $R^7$, $R^8$ and $R^9$, independently of one another, represent —$CH_3$, —$CH_2CH_3$; —$OCH_3$; —$OCH_2CH_3$ or most preferably $R^1$ and $R^2$, $R^4$ and $R^5$, $R^6$ and $R^7$ or $R^8$ and $R^9$ are taken together to represent —$OCH_2CH_2O$— wherein the hydrogen can be replaced with a solubilizing group, a halide or an alkyl.

The polymer layer can be formed by in-situ polymerization on the surface or by applying a slurry of polymer onto the dielectric coated such as by dipping or spraying. These techniques are described in the literature and are widely understood and will not be further explained herein. Achieving adequate coverage of the edges and corners is difficult as set forth above. The choice of method for forming the polymer layer is selected based, in part, on the location of the layer being formed. It is widely known that a conductive polymer layer is typically formed by multiple applications of thinner layers each of which may be formed by either in-situ polymerization or by slurry dipping. Materials which enhance corner and edge coverage can be employed and may be beneficial to the overall reliability of the capacitor but are not necessary for demonstration of the instant invention.

After the desired numbers of polymer layers are formed, or the desired thickness is achieved, it is preferable to apply layers which facilitate adhesion to a lead frame. Conductive carbon layers followed by conductive metal layers, particularly noble metal or semi-noble metal layers are formed on the conductive polymer. Conductive carbon layers can also be rendered hydrophobic to help retain moisture in the conductive polymer layer. Carbon can be made hydrophobic by use of hydrophobicity enhancing materials described above. Carbon layer can further comprise moisture retaining compounds to further improve moisture retention of the cathode layer. The capacitor is finished after attaching to external leads, encapsulation, testing, packaging and the like.

The moisture content determination was done using the Karl Fischer method which is a coulometric titration method using Karl Fischer reagent, which reacts quantitatively and selectively with water, to measure moisture content. Karl Fischer reagent consists of iodine, sulfur dioxide, a base and a solvent, such as alcohol. In this test, the moisture containing sample can be mixed with Karl Fischer reagent directly in the titration vessel. Alternatively, the sample can be heated to a higher temperature and the moisture vapor then reacts with the Karl Fischer reagent in the titration vessel. The amount of water is directly proportional to the iodine consumed in the reaction. In the coulometric titration method, iodine is produced through an electrolytic oxidation and can be measured by the quantity of the electricity used. The water content is therefore determined from the coulombs required in the titration. 5 g of the dispersion sample was dried in a 4 inch Al pan at 150° C. in a convection oven for 30 minutes, followed by conditioning at RH71%, 74° F. for 48+ hours. The samples were sealed until testing. The sample was placed in a Karl Fischer sample holder and the titration was done at 250° C. In a comparative study the moisture content by Karl Fischer the method was determined to be 17-18% for the control sample using Clevious KV2 which is a widely used conductive polymer for capacitors.

Moisture content and moisture loss are determined on a film wherein the film has identical composition to that in the capacitor layer being analyzed. Therefore, the percent moisture, percent moisture loss, etc. can be easily determined experimentally with the results considered to be representative of the same results as would be obtained in a capacitor.

The moisture content and moisture loss at different temperatures are measured on a film formed from the conductive polymer dispersion using the following method. 5 g of the dispersion sample was dried in a 4 inch Al pan at 150° C. in a convection oven for 30 minutes, followed by conditioning at RH71%, 74° F. for 48+ hours. The conditioned film was placed in a thermogravimetric analyzer (TGA) and heated at scan rate of 40° C./min to reach the desired temperature (T). At the temperature (T), the sample was kept for 30 min and the weight loss was measured. The dry weight (Wdry) is determined using the TGA. The moisture content was determined for other states by repeating the steps except that a different drying temperature (T) was used such that 100° C.<T<200° C. The weight (WT) of the film after 30 min at temperature (T) was plotted and moisture content at temperatures of interest was determined by interpolation. The weight content and moisture retention was determined by the equations:

Wdry=weight of film after isothermal TGA at 200° C.
WT=wt of film at specified temperature T using isothermal TGA Moisture content $T=100*(WT-Wdry)/WT$ Moisture retention=Moisture content at $T2$−Moisture content $T1$ wherein $T1>T2$ Moisture content determined by the TGA method was determined to be 17% for the control, using Clevios KV2, based on the assumption that all moisture is lost at 200° C. after 15 min. Moisture loss was measured using the following method.

Using isothermal TGA for the sample was run at various temperatures and a regression equations for each sample is generated. Using the regression equations, weight loss at four different temperatures was determined for control and inventive samples, and reported in Table 1.

TABLE 1

| TGA temperature | Wt loss after 30 min at temperature Control (clevios KV2) | Wt loss after 30 min at temperature Inventive |
|---|---|---|
| 100 | −9.1017 | −13.946 |
| 125 | −12.1342 | −14.966 |
| 150 | −15.1667 | −15.986 |
| 175 | −18.1992 | −17.006 |

The moisture loss at 175° C. relative to 125° C. for the control was determined as −18.1−(−12.1)=−6 and for the inventive the moisture loss under the same conditions was calculated as −17−(−14.9)=−2.1% which shows a significant improvement for the inventive example.

Comparative Example 1

Tantalum anodes were anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodes. This process was repeated 6 times. A commercial conductive polymer dispersion, available as Clevios KV2, was applied 2-4 times to form a thick external polymer layer. A conventional graphite coating was applied followed by a silver layer.

Inventive Example 1

Parts were prepared in the same manner as in Comparative Example 1 except the conductive polymer dispersion was prepared with a hydrophilic polymer, polyethylene oxide (designated as HL). A conventional graphite coating was applied followed by a silver layer. Parts were assembled and ESR before and after surface mount was measured. Moisture content versus leakage current was determined and is reported in Table 2.

Inventive Example 2

Parts were prepared in the same manner as in Comparative Example 1 except the conductive polymer dispersion was prepared with an oligomer with hydroxyl and carboxylic groups available for crosslinking, designated as HP. A conventional graphite coating was applied followed by a silver layer. Parts were assembled and ESR before and after surface mount was measured. Moisture content versus leakage current was determined and is reported in Table 2.

TABLE 2

|  | Moisture content % (KF method) | Leakage (microamp) |
|---|---|---|
| Comparative Example | 18 | 191 |
| Inventive Example 1 (HL) | 24 | 122 |
| Inventive Example 2 (HP) | 13 | 346 |

Inventive Example 3

Parts were prepared in the same manner as in Comparative Example 1 except the conductive polymer dispersion was prepared with a mixture of polymers comprising polyethylene oxide, polyvinyl alcohol, and hydroxyethyl cellulose, designated as HLx. A conventional graphite coating was applied followed by a silver layer. Parts were assembled and ESR before and after surface mount was measured. The moisture content was determined by the Karl Fischer method to be 24 wt % versus 18 wt % for Comparative Example 2. The effect of moisture content on leakage after post stimulated SMT at 260° C. with two cycles is illustrated in FIG. 3.

Inventive Example 4

Parts were prepared in the same manner as in Comparative Example 1 except that a dual layer of conductive polymer dispersion was used. The first conductive polymer layer was prepared from a hydrophilic polymer, HL, and second conductive polymer layer was prepared from a hydrophobic polymer, HP crosslinkable polyester. Five groups of capacitors were prepared with various layer structures, each designated with a number indicating number of layers from each category. HL3/HP2 indicates 3 layers of HL conductive polymer dispersion and 2 layers of hydrophobic polymer. A conventional graphite coating was applied followed by a silver layer. The effect of the combined layered structures on leakage and equivalent series resistance (ESR) is provided in Table 3.

TABLE 3

| Conductive dispersion layer structure | Leakage (microamp) | ESR (mohms) |
|---|---|---|
| HL5 | 25.18 | 26.85 |
| HL3/HP2 | 37.10 | 26.99 |
| HL2/HP3 | 82.17 | 29.48 |
| HL1/HP4 | 219.39 | 28.68 |
| Control 5 | 442.86 | 32.33 |

The results presented in Table 3 demonstrate the advantages offered by the invention.

The invention has been described with reference to the preferred embodiments without limit thereto. One of skill in the art would realize additional embodiments and alterations which are not specifically stated but which are within the scope of the invention as set forth in the claims appended hereto.

The invention claimed is:

1. A capacitor comprising:
an anode;
a dielectric over said anode;
a conductive polymer layer over said dielectric;
wherein said conductive polymer layer has a moisture content of at least 16 wt % and a moisture loss of no more than 5 wt % upon heating from 125° C. to 175° C.

2. The capacitor of claim 1 wherein said moisture content is at least 21 wt %.

3. The capacitor of claim 2 wherein said moisture content is at least 24 wt %.

4. The capacitor of claim 3 wherein said moisture content is at least 27 wt %.

5. The capacitor of claim 1 wherein said moisture loss is less than 3 wt %.

6. The capacitor of claim 5 wherein said moisture loss is less than 1 wt %.

7. The capacitor of claim 1 wherein said conductive polymer layer comprises a moisture retaining compound.

8. The capacitor of claim 7 wherein said moisture retaining compound is selected from the group consisting of a hydrogel, a molecular sieve and a molecular container.

9. The capacitor of claim 8 wherein said molecular sieve is zeolite.

10. The capacitor of claim 8 wherein said molecular container is cyclodextrin or a derivative thereof.

11. The capacitor of claim 8 wherein said hydrogel is crosslinked.

12. The capacitor of claim 11 wherein said hydrogel is crosslinked with a conductive polymer of said conductive polymer layer.

13. The capacitor of claim 11 wherein said hydrogel is crosslinked with a crosslinking agent.

14. The capacitor of claim 13 wherein said crosslinking agent comprises functional groups selected from hydroxyl and carboxyl.

15. The capacitor of claim 7 wherein at least said moisture retaining component is encapsulated in a binder.

16. The capacitor of claim 15 wherein said binder has a Tg of at least 100° C.

17. The capacitor of claim 16 wherein said binder has a Tg of at least 150° C.

18. The capacitor of claim 1 further comprising an adhesive layer wherein said adhesive layer comprises at least one carbon layer wherein said carbon layer comprises at least one material selected from the group consisting of a hydrophobic compound and a moisture retaining compound.

19. A capacitor comprising:
an anode;
a dielectric over said anode;
a first conductive polymer layer over said dielectric wherein said first conductive polymer layer comprises a polyanion and a first binder; and
a second conductive polymer layer over said first conductive polymer layer wherein said second conductive polymer layer comprises a polyanion and a second binder wherein said first binder is more hydrophilic than said second binder.

20. The capacitor of claim 19 wherein said first conductive polymer layer has a moisture content of at least 21 wt %.

21. The capacitor of claim 19 wherein said second conductive polymer layer has a moisture content of no more than 15 wt % at 125° C.

22. The capacitor of claim 19 wherein said first binder is a hydrophilic polymer.

23. The capacitor of claim 19 wherein said first binder is a hydrophilic material selected from the group consisting of poly(ethylene oxide), poly(vinyl alcohol), hydroxyl ethyl cellulose, polyvinylpyrrolidone, poly(hydroxyethyl methacrylate), polyurethane, poly(ethyleneglycol), poly(propylene glycol), poly(vinylpyrrolidone), Xanthan, methyl cellulose, starch, poly(vinylpyrrolidone), poly(acrylic acid), carboxymethyl cellulose, hydroxypropyl methyl cellulose, polyvinyl alcohol, acrylic acid, methacrylic acid, chitosan, αβ-glycerophosphate, hydrophilic polyester, polyphosphazene, polypeptide, poly(vinyl methyl ether) and poly(N-isopropyl acrylamide).

24. The capacitor of claim 23 wherein said first binder is at least one hydrophilic material selected from the group consisting of poly(ethylene oxide), poly(vinyl alcohol) and hydroxyl ethyl cellulose.

25. The capacitor of claim 23 wherein said hydrophilic material is crosslinked.

26. The capacitor of claim 25 wherein said hydrophilic material is crosslinked with a conductive polymer of said first conductive polymer layer.

27. The capacitor of claim 23 wherein said hydrophilic material is crosslinked with a crosslinking agent.

28. The capacitor of claim 27 wherein said crosslinking agent comprises functional groups selected from hydroxyl and carboxyl.

29. The capacitor of claim 19 wherein said second binder is a hydrophobic material.

30. The capacitor of claim 29 wherein said hydrophobic material is selected from the group consisting of thermosetting materials, fluoro-polymers and their copolymers, silicone polymers and their copolymers, silicone polyester, crosslinkable polyester and crosslinkable epoxies.

31. The capacitor of claim 30 wherein said hydrophobic material is polytetrafluoroethylene.

32. The capacitor of claim 19 wherein at least one of said first conductive polymer layer or said second conductive polymer layer comprises a moisture retaining component.

33. The capacitor of claim 32 wherein said moisture retaining component is a material selected from the group consisting of a hydrogel, a molecular sieve, and a molecular container.

34. The capacitor of claim 32 wherein at least said moisture retaining component is encapsulated in a polymeric encapsulant.

35. The capacitor of claim 34 wherein said polymeric encapsulant has a Tg of at least 100° C.

36. The capacitor of claim 35 wherein said polymeric encapsulant has a Tg of at least 150° C.

37. The capacitor of claim 19 wherein at least one of said first conductive polymer layer or said second conductive polymer layer has a moisture loss of no more than 5 wt % upon heating from 125° C. to 175° C.

38. The capacitor of claim 37 wherein said moisture loss is no more than 3 wt %.

39. The capacitor of claim 37 wherein said moisture loss is no more than 1 wt %.

40. The capacitor of claim 19 wherein said first conductive polymer layer has a moisture content which is at least 110 wt % of a moisture content of said second conductive polymer layer.

41. The capacitor of claim 40 wherein said first conductive polymer layer has a moisture content which is at least 150 wt % of the moisture content of said second conductive polymer layer.

42. The capacitor of claim 41 wherein said first conductive polymer layer has a moisture content which is at least 200 wt % of the moisture content of said second conductive polymer layer.

43. The capacitor of claim 19 further comprising an adhesive layer wherein said adhesive layer comprises at least one carbon layer wherein said carbon layer comprises at least one material selected from the group consisting of a hydrophobic compound and a moisture retaining compound.

44. A capacitor comprising:
an anode;
a dielectric over said anode;
a first conductive polymer layer over said dielectric wherein said first conductive polymer layer comprises a binder and a polyanion and said first conductive polymer layer has a first moisture content;
a second conductive polymer layer over said first conductive polymer layer wherein said second conductive polymer layer comprises a binder and a polyanion and said second conductive polymer layer has a second moisture content; and
wherein said first moisture content is at least 5 wt % higher than said second moisture content.

45. The capacitor of claim 44 wherein said first conductive polymer layer has a moisture content of at least 21 wt %.

46. The capacitor of claim 44 wherein said second conductive polymer layer has a moisture content of no more than 15 wt %.

47. The capacitor of claim 44 wherein said first conductive polymer layer comprises a hydrophilic polymer.

48. The capacitor of claim 44 wherein said first conductive polymer layer comprises a hydrophilic material selected from the group consisting of poly(ethylene oxide), poly(vinyl alcohol), hydroxyl ethyl cellulose, polyvinylpyrrolidone, poly(hydroxyethyl methacrylate), polyurethane, poly(ethyleneglycol), poly(propylene glycol), poly(vinylpyrrolidone), Xanthan, methyl cellulose, starch, poly(vinylpyrrolidone), poly(acrylic acid), carboxymethyl cellulose, hydroxypropyl methyl cellulose, polyvinyl alcohol, acrylic acid, methacrylic acid, αβ-glycerophosphate, hydrophilic polyester, polyphosphazene, polypeptide, chitosan, poly (vinyl methyl ether) and poly(N-isopropyl acrylamide).

49. The capacitor of claim 48 wherein said first conductive polymer layer comprises at least one hydrophilic material selected from the group consisting of poly(ethylene oxide), poly(vinyl alcohol) and hydroxyl ethyl cellulose.

50. The capacitor of claim 48 wherein said hydrophilic material is crosslinked.

51. The capacitor of claim 50 wherein said hydrophilic material is crosslinked with a crosslinking agent.

52. The capacitor of claim 51 wherein said crosslinking agent comprises functional groups selected from hydroxyl and carboxyl.

53. The capacitor of claim 50 wherein said hydrophilic material is crosslinked with a conductive polymer of said first conductive polymer layer.

54. The capacitor of claim 44 wherein said second conductive polymer comprises a hydrophobic material.

55. The capacitor of claim 54 wherein said hydrophobic material is selected from the group consisting of thermosetting materials, fluoro-polymers and their copolymers, silicone polymers and their copolymers, silicone polyester, crosslinkable polyester and crosslinkable epoxies.

56. The capacitor of claim 55 wherein said hydrophobic material is polytetrafluoroethylene.

57. The capacitor of claim 44 wherein at least one of said first conductive polymer or said second conductive polymer comprises a moisture retaining component.

58. The capacitor of claim 57 wherein said moisture retaining component is a material selected from the group consisting of a hydrogel, a molecular sieve, and a molecular container.

59. The capacitor of claim 57 wherein at least said moisture retaining component is encapsulated in a polymeric encapsulant.

60. The capacitor of claim 59 wherein said polymeric encapsulant has a Tg of at least 100° C.

61. The capacitor of claim 60 wherein said polymeric encapsulant has a Tg of at least 150° C.

62. The capacitor of claim 44 wherein at least one of said first conductive polymer layer or said second conductive polymer layer has a moisture loss of no more than 5 wt % upon heating from 125° C. to 175° C.

63. The capacitor of claim 62 wherein said moisture loss is no more than 3 wt %.

64. The capacitor of claim 62 wherein said moisture loss is no more than 1 wt %.

65. The capacitor of claim 44 wherein said first conductive polymer layer has a moisture content which is at least 110 wt % of a moisture content of said second conductive polymer layer.

66. The capacitor of claim 65 wherein said first conductive polymer layer has a moisture content which is at least 150 wt % of the moisture content of said second conductive polymer layer.

67. The capacitor of claim 66 wherein said first conductive polymer layer has a moisture content which is at least 200 wt % of the moisture content of said second conductive polymer layer.

68. The capacitor of claim 44 further comprising an adhesive layer wherein said adhesive layer comprises at least one carbon layer wherein said carbon layer comprises at least one material selected from the group consisting of a hydrophobic compound and a moisture retaining compound.

69. A capacitor comprising:
an anode;
a dielectric over said anode;
a first polymer layer over said dielectric;
a second polymer over said first polymer layer wherein said first polymer layer and said second polymer layer has a moisture loss of less than 5 wt % upon heating from 125° C. to 175° C.

70. The capacitor of claim 69 wherein the moisture loss is less than 3 wt %.

71. The capacitor of claim 70 wherein the moisture loss is less than 1 wt %.

72. The capacitor of claim 69 wherein said first polymer layer has a higher moisture content than said second polymer layer.

73. A capacitor comprising:
an anode;
a dielectric over said anode;
a first conductive polymer layer over said dielectric wherein said first conductive polymer layer has a moisture content of at least 20 wt %; and a second conductive polymer layer over said first conductive polymer layer wherein said second conductive polymer layer comprises at least one material selected from a hydrophobic material and a moisture retaining compound.

74. The capacitor of claim 73 wherein said first conductive polymer layer has a moisture content of at least 21 wt %.

75. The capacitor of claim 73 wherein said second conductive polymer layer has a moisture content of no more than 15 wt % at 125° C.

76. The capacitor of claim 73 wherein said first conductive polymer layer comprises a hydrophilic polymer.

77. The capacitor of claim 73 wherein said first conductive polymer layer comprises a hydrophilic material selected from the group consisting of poly(ethylene oxide), poly(vinyl alcohol), hydroxyl ethyl cellulose, polyvinylpyrrolidone, poly(hydroxyethyl methacrylate), polyurethane, poly(ethyleneglycol), poly(propylene glycol), poly(vinylpyrrolidone), Xanthan, methyl cellulose, starch, poly(vinylpyrrolidone), poly(acrylic acid), carboxymethyl cellulose, hydroxypropyl methyl cellulose, polyvinyl alcohol, acrylic acid, methacrylic acid, chitosan, αβ-glycerophosphate, hydrophilic polyester, polyphosphazene, polypeptide, poly(vinyl methyl ether) and poly(N-isopropyl acrylamide).

78. The capacitor of claim 77 wherein said first conductive polymer layer comprises at least one hydrophilic material selected from the group consisting of poly(ethylene oxide), poly(vinyl alcohol) and hydroxyl ethyl cellulose.

79. The capacitor of claim 77 wherein said hydrophilic material is crosslinked.

80. The capacitor of claim 79 wherein said hydrophilic material is crosslinked with a crosslinking agent.

81. The capacitor of claim 80 wherein said crosslinking agent comprises functional groups selected from hydroxyl and carboxyl.

82. The capacitor of claim 79 wherein said hydrophilic material is crosslinked with a conductive polymer of said first conductive polymer layer.

83. The capacitor of claim 73 wherein said hydrophobic material is selected from the group consisting of thermosetting materials, fluoro-polymers and their copolymers, silicone polymers and their copolymers, silicone polyester, crosslinkable polyester and crosslinkable epoxies.

84. The capacitor of claim 83 wherein said hydrophobic material is polytetrafluoroethylene.

85. The capacitor of claim 73 wherein said moisture retaining component is a material selected from the group consisting of a hydrogel, a molecular sieve, and a molecular container.

86. The capacitor of claim 73 wherein at least said moisture retaining component is encapsulated in a polymeric encapsulant.

87. The capacitor of claim 86 wherein said polymeric encapsulant has a Tg of at least 100° C.

88. The capacitor of claim 87 wherein said polymeric encapsulant has a Tg of at least 150° C.

89. The capacitor of claim 73 wherein at least one of said first conductive polymer layer or said second conductive polymer layer has a moisture loss of no more than 5 wt % upon heating from 125° C. to 175° C.

90. The capacitor of claim 89 wherein said moisture loss is no more than 3 wt %.

91. The capacitor of claim 89 wherein said moisture loss is no more than 1 wt %.

92. The capacitor of claim 73 wherein said first conductive polymer layer has a moisture content which is at least 110 wt % of a moisture content of said second conductive polymer layer.

93. The capacitor of claim 92 wherein said first conductive polymer layer has a moisture content which is at least 150 wt % of the moisture content of said second conductive polymer layer.

94. The capacitor of claim 93 wherein said first conductive polymer layer has a moisture content which is at least 200 wt % of the moisture content of said second conductive polymer layer.

* * * * *